United States Patent
Usui (10) Patent No.: US 7,898,123 B2
(45) Date of Patent: Mar. 1, 2011

(54) PERMANENT MAGNET TYPE ROTARY MACHINE

(75) Inventor: Hiroaki Usui, Ueda (JP)

(73) Assignee: Shinano Kenshi Kabushiki Kaisha, Ueda-Shi (JP)

( * ) Notice: Subject to any disclaimer, the term of this patent is extended or adjusted under 35 U.S.C. 154(b) by 17 days.

(21) Appl. No.: 11/642,680

(22) Filed: Dec. 21, 2006

(65) Prior Publication Data

US 2007/0145834 A1 Jun. 28, 2007

(30) Foreign Application Priority Data

Dec. 22, 2005 (JP) .............................. 2005-370511

(51) Int. Cl.
H02K 37/00 (2006.01)
H02K 37/12 (2006.01)
H02K 37/14 (2006.01)

(52) U.S. Cl. .................. 310/49.01; 310/45; 310/49.11; 310/156.69; 310/156.71; 310/156.73; 310/156.66; 310/106; 310/156.47; 310/156.26; 310/145

(58) Field of Classification Search ............... 310/47 R, 310/156.69, 156.71, 156.73, 156.66, 106, 310/156.47, 259, 49 R, 145, 49.11, 154.26, 310/216.87; H02K 37/00, 37/12, 37/14

See application file for complete search history.

(56) References Cited

U.S. PATENT DOCUMENTS

| 3,549,918 | A | * | 12/1970 | Hout Henricus et al. . | 310/49.17 |
| 4,933,584 | A | * | 6/1990 | Harms et al. ................. | 310/162 |
| 5,034,642 | A | * | 7/1991 | Hoemann et al. ...... | 310/156.47 |
| 5,291,084 | A | * | 3/1994 | Shiotsuki et al. ......... | 310/49.16 |

(Continued)

FOREIGN PATENT DOCUMENTS

JP 49-97708 U 8/1974

(Continued)

OTHER PUBLICATIONS (NREL 2002.pdf) Jan. 2002 NREL/CP-500-30768 "Cogging Torque Reduction in a Permanent Magnet Wind Turbine Generator" E. Muljadi and J. Green, the 21st American Society of Mechanical Engineers Wind Energy Symposium Reno, Nevada, Jan. 14-17, 2002.*

(Continued)

Primary Examiner—Quyen Leung
Assistant Examiner—John K Kim
(74) Attorney, Agent, or Firm—Birch, Stewart, Kolasch & Birch, LLP (57) ABSTRACT

The permanent magnet type rotary machine is capable of reducing cogging torque caused by variation of amounts of magnetic flux in magnetic circuits. The permanent magnet type rotary machine comprises: a stator constituted by stator units, which are coaxially stacked and in each of which a coil is sandwiched between stator yokes; and a rotor including a permanent magnet having magnetic poles, which respectively face magnetic pole teeth of the stator yokes, the rotor being rotatably supported by an output shaft. The stator units in one phase is divided into n (n is an integer one or more), and magnetic centers of at least one pair of the magnetic pole teeth of the adjacent stator yokes, which are vertically arranged, are shifted with a prescribed phase difference so as to mutually cancel their cogging torque.

1 Claim, 10 Drawing Sheets

U.S. PATENT DOCUMENTS

| | | | |
|---|---|---|---|
| 5,410,200 A * | 4/1995 | Sakamoto et al. | 310/49 R |
| 5,691,583 A * | 11/1997 | Suzuki et al. | 310/49.13 |
| 5,760,503 A * | 6/1998 | Tsuchida et al. | 310/49 R |
| 6,031,305 A * | 2/2000 | Satoh et al. | 310/49 R |
| 6,060,800 A * | 5/2000 | Suzuki et al. | 310/49 R |
| 6,259,176 B1 * | 7/2001 | Isozaki et al. | 310/49 R |
| 6,323,569 B1 * | 11/2001 | Akama | 310/49.11 |
| 6,479,911 B1 * | 11/2002 | Koike et al. | 310/49.24 |
| 6,809,438 B2 * | 10/2004 | Suzuki et al. | 310/49.36 |
| 6,867,525 B2 * | 3/2005 | Ionel et al. | 310/156.47 |
| 7,291,945 B2 * | 11/2007 | Nashiki | 310/49 R |
| 2001/0048251 A1 * | 12/2001 | Ieoka | 310/49 R |
| 2002/0003382 A1 * | 1/2002 | Nakano et al. | 310/156.47 |
| 2002/0113501 A1 * | 8/2002 | Doi | 310/49 R |
| 2002/0180282 A1 * | 12/2002 | Suzuki et al. | 310/49 R |
| 2002/0190585 A1 * | 12/2002 | Sakamoto | 310/49 R |
| 2005/0023905 A1 * | 2/2005 | Sakamoto | 310/12 |
| 2005/0121989 A1 * | 6/2005 | Suzuki | 310/156.06 |
| 2005/0218730 A1 * | 10/2005 | Matsushita | 310/49 R |
| 2007/0145834 A1 * | 6/2007 | Usui | 310/49 R |
| 2007/0205689 A1 * | 9/2007 | Nemoto et al. | 310/156.47 |

FOREIGN PATENT DOCUMENTS

| | | |
|---|---|---|
| JP | 3-93451 A | 4/1991 |
| JP | 9-163798 A | 6/1997 |
| JP | 9-286365 A | 11/1997 |
| JP | 10-127024 A | 5/1998 |
| JP | 2005-253280 | 9/2005 |

OTHER PUBLICATIONS

Miller.pdf : Miller et al, "Design of Brushless Permanent Magnet Motors", 1994.*

Miller_skew_cog.pdf; Design of Brushless Permanent Magnet Motors, Hendershot, Miller, 1994.*

Miller_cogging.pdf : "Design and Brushless Permanent-Magnet Motors", Miller, 1994.*

* cited by examiner

PERMANENT MAGNET TYPE ROTARY MACHINE

BACKGROUND OF THE INVENTION

The present invention relates to a permanent magnet type rotary machine employed in office automation machines, e.g., copier, printer, peripheral equipments of a computer system, vehicles, factory automation machines, e.g., conveyor, etc.

There are many permanent magnet type rotary machines—such as a PM type step motor having a permanent magnet rotor, a hybrid (HB) type step motor having a gear-shaped iron core and a permanent magnet, and a brushless motor having a magnetic pole detecting unit for feedback control. A permanent magnet type rotary machine, which has comb-shaped magnetic pole teeth facing a rotor, includes: a plurality of stator units stacked in the axial direction; and a rotor having a permanent magnet, which faces the stator units and is alternately magnetized as N-poles and S-poles. By passing a current through coils of the stator units with switching the current direction, stator magnetic poles and rotor magnetic poles mutually attract and repel so that the rotor can be rotated.

In the permanent magnet type rotary machine having the comb-shaped magnetic pole teeth facing the rotor, number of the stacked stator units is equal to number of phases of the magnetizing current. For example, in case of a two-phase motor, an A-phase stator unit and a B-phase stator unit are stacked. Torque of a step motor is resultant torque of torque generated by a magnetizing current and cogging torque (detent torque) generated by variation of magnetic resistance between a rotor and stator yokes. Cogging torque elements become high harmonic elements of motor torque, so rotational fluctuation and vibration are caused. Thus, the same step motor is serially connected to an output shaft of said step motor, which is an example of the permanent magnet type rotary machine, and their phase are mutually shifted a half of a detent torque cycle in the rotational direction, so that vibration elements caused by the detent torque can be reduced (see Japanese Patent Gazette No. 9-163798).

Further, to rapidly reduce motor vibration caused by high harmonic elements included in waves of an induced back electromotive force, a step motor, in which areas of comb-shaped teeth of stator yokes and clearances therebetween are varied so as to offset third high harmonic waves and reduce vibration, has been developed (see Japanese Patent Gazette No. 10-127024).

These days, high torque small motors have been required. Thus, a motor having a rotor, whose magnet is made of a rare-earth metal, e.g., Nd—Fe—B, with high maximum energy product, has been developed. By using such rare-earth metal, a high torque small motor can be realized.

Large torque can be generated, however, amounts of magnetic flux significantly vary in magnetic circuits formed between stator yokes and a permanent magnet. Therefore, cogging torque and rotational vibration are increased, and rotational fluctuation become worse.

In case of using the rare-earth magnet whose maximum energy product is high, the amounts of magnetic flux passing the magnetic circuits are increased, so the magnetic flux passing the magnetic circuits of the stator yokes are easily saturated. To solve this problem, thicknesses of the stator yokes must be thicker. However, in the permanent magnet type rotary machine having comb-shaped magnetic pole teeth, it is difficult to precisely form the stator yokes by press working. Further, a die set for the pressing work must be large, so that a huge manufacturing facility must be required and the production cost must be increased.

On the other hand, a plurality of stator units may be stacked. In this case, thicknesses of stator cores are not changed, but stator yokes are piled each other. However, magnetic circuits are formed between a stator and a permanent magnet, depending on a rotational position of a rotor, and cogging torque is newly generated by variation of amounts of magnetic flux in magnetic circuits formed between magnetic pole teeth of the adjacent stator yokes, so that the resultant cogging torque of a motor must be increased.

SUMMARY OF THE INVENTION

The present invention was conceived to solve the above described problems.

An object of the present invention is to provide a permanent magnet type rotary machine, which is small in size and capable of reducing cogging torque caused by variation of amounts of magnetic flux in magnetic circuits formed between magnetic pole teeth of adjacent stator yokes.

To achieve the object, the present invention has following structures.

Namely, the permanent magnet type rotary machine of the present invention comprises:

a stator being constituted by a plurality of stator units, which are coaxially stacked and in each of which a coil is sandwiched between stator yokes; and a rotor including a permanent magnet having magnet poles, which respectively face magnetic pole teeth of the stator yokes, the rotor being held by an output shaft and capable of rotating about the output shaft, and the stator units in one phase is divided into n (n is an integer one or more), and magnetic centers of at least one pair of the magnetic pole teeth of the adjacent stator yokes, which are vertically arranged, are shifted with a prescribed phase difference so as to highly reduce their cogging torque.

In the permanent magnet type rotary machine, the prescribed phase difference is an electric angle of 90°±30°.

In the permanent magnet type rotary machine, a supplementary magnetic pole may be coaxially stacked on an even number of the stator units, and the supplementary magnetic pole has magnetic pole teeth arranged with a prescribed phase difference to the magnetic pole teeth of the adjacent stator yoke so as to reduce cogging torque generated by a magnetic circuit formed in boundary face between the adjacent stator yokes.

In the permanent magnet type rotary machine, a space may be formed between the adjacent stator units.

In the permanent magnet type rotary machine of the present invention, the stator units in one phase is divided into n (n is an integer one or more), and the magnetic centers of at least one pair of the magnetic pole teeth of the adjacent stator yokes, which are vertically arranged, are shifted with the prescribed phase difference so as to highly reduce their cogging torque. With this structure, the cogging torque, which is caused by variation of amounts of magnetic flux in magnetic circuits formed between the magnetic pole teeth of the adjacent stator yokes, can be offset by the phase difference, so that the resultant cogging torque of the whole rotary machine can be reduced. Especially, the cogging torque caused by variation of amounts of the magnetic flux in the magnetic circuits, which are formed between the magnetic pole teeth of the vertically stacked stator yokes by passing the magnetic flux therethrough, can be effectively reduced. In case that the magnetic centers of at least one pair of the magnetic pole teeth of the adjacent stator yokes, which are vertically arranged, are shifted with the phase difference of 90°+−30°, preferably 90°, the cogging torque can be highly reduced.

By using a rare-earth magnet, whose maximum energy product is high, and increasing number of the stacked stator units, a total sectional area of the stator yokes can be broadened so that the small permanent magnet type rotary machine, which is capable of generating large torque, can be produced without considerably increasing processing accuracy and production costs.

In case that the supplementary magnetic pole is coaxially stacked on an even number of the stator units and has the magnetic pole teeth arranged with the prescribed phase difference for highly reducing the cogging torque generated by the magnetic circuit formed in the boundary face between the adjacent stator yokes, said cogging torque can be highly reduced.

By forming the space between the adjacent stator units vertically stacked, magnetic circuits passing through the magnetic pole teeth of the vertically adjacent stator units are magnetically blocked, so that the cogging torque, which is caused by variation of amounts of magnetic flux in the magnetic circuits, can be reduced.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings. In the following embodiments, step motors will be explained as the permanent magnet type rotary machines.

In each of the embodiments, the step motor is a claw pole type step motor comprising: a stator constituted by a plurality of stator units, which are coaxially stacked and in each of which a coil is sandwiched between stator yokes and magnetic pole teeth (claw poles) are mutually engaged; and a rotor including a permanent magnet having magnetic poles, which respectively face the claw poles of the stator yokes.

An example for the explanation is given as the step motor, which is an outer rotor type two-phase step motor, and is assembled in office automation machines, peripheral equipment of a computer system, vehicles, factory automation machines, e.g., conveyor, etc.

Figure 1:
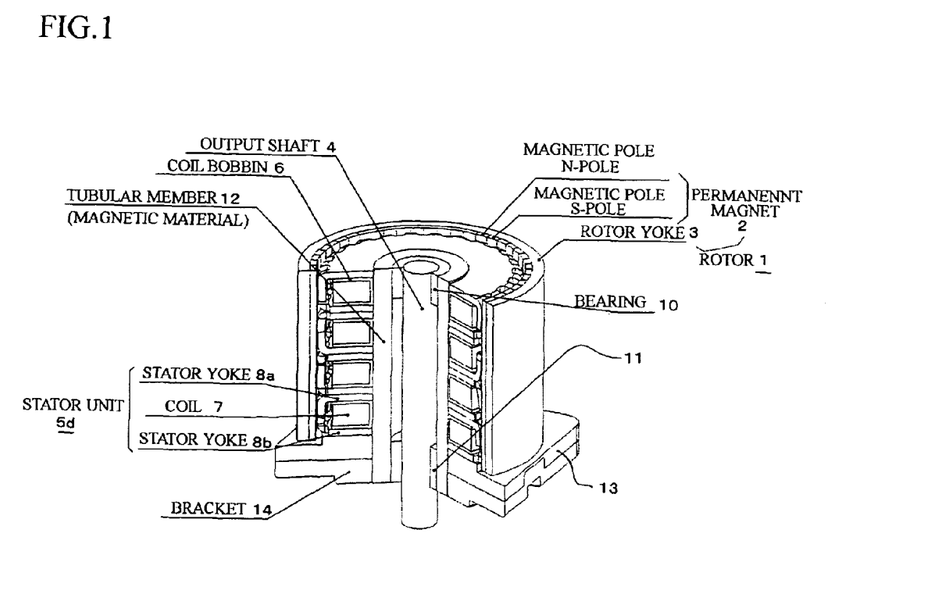
FIG. 1 is a partial cutaway view of a two-phase step motor.

An outline of the two-phase step motor will be explained with reference to FIG. 1. In FIG. 1, a permanent magnet 2, in which multi-pole are formed in the circumferential direction, is fixed on an inner circumferential face of a cylindrical rotor yoke 3. The permanent magnet 2 is made of a rare-earth metal, e.g., Nd—Fe—B, whose maximum energy product is high, and faces claw poles of a stator to be described later. A rotor 1 is joined with and supported by rotor shaft (output shaft) 4.

Figure 2:
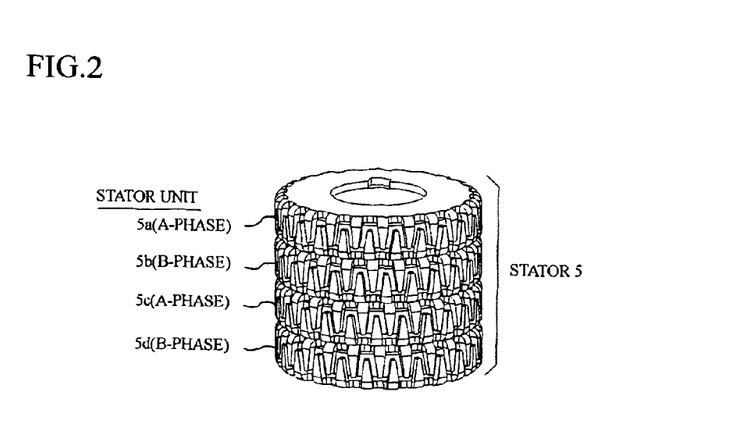
FIG. 2 is a perspective view of a stator.

In a stator shown in FIG. 2, the stator units in one phase is divided into n (n is an integer one or more; n=2 in the present embodiment) and coaxially stacked in the axial direction. For example, the stator 5 includes first stator units 5a (A-phase) and 5b (B-phase) and second stator units 5c (A-phase) and 5d (B-phase). Two stator units are assigned to each of the A- and B-phases. Namely, four stator units are coaxially stacked in said order (A-phase, B-phase, A-phase and B-phase). Even if the permanent magnet 2 is made of the rare-earth metal whose maximum energy product is high, a total sectional area of stator yokes 8a and 8b and magnetic paths can be broadened, by increasing number of the stacked stator units, without thickening the stator yokes 8a and 8b. The stator units 5a and 5c of the A-phase and the stator units 5b and 5d of the B-phase are stacked with a phase difference so as to bias the rotor 1 in the rotational direction. Note that, the stator units may be stacked in order of A-phase, B-phase, B-phase and A-phase.

Figure 3:
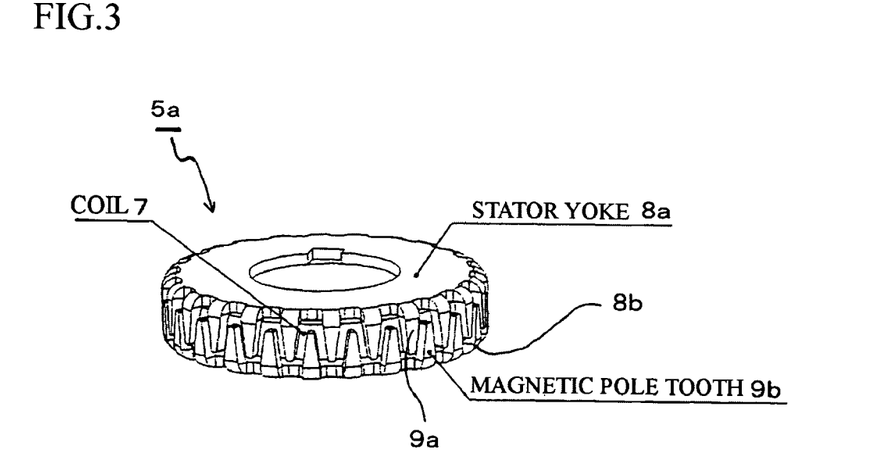
FIG. 3 is a perspective view of one stator unit.

The stator unit 5a of the stator 5 will be explained with reference to FIG. 3. In the stator unit 5a, a coil 7, which is wound on a coil bobbin 6, is vertically sandwiched between stator yokes 8a and 8b, which are made of a magnetic material, and comb-shaped magnetic pole teeth (claw poles) 9a and 9b are mutually engaged. Namely, the coil 7 is wound on the coil bobbin 6, which is constructed in axis center of the stator yokes 8a and 8b of the A- and B-phases. When a current passes through the coil 7, an even number of stator magnetic poles are formed on a plane perpendicular to the rotor shaft 4. N-poles and S-poles are alternately formed as the stator magnetic poles. The coils 7 of the same stator units 5a and 5c (A-phase) are connected in series or parallel; the coils 7 of the same stator units 5b and 5d (B-phase) are connected in series or parallel.

In FIG. 1, the stator yokes 8a and 8b are coaxially assembled on an outer circumferential face of a cylinder 12, which is made of a magnetic material. Bearings 10 and 11 for rotatably supporting the rotor shaft 4 are assembled in an inner part of the cylinder 12. Further, a motor circuit board 13 and a bracket 14 are integrally assembled on the outer circumferential face of the cylinder 12.

Next, magnetic circuits formed in the permanent magnet (PM) type step motor, which generate cogging torque, will be explained. Note that, the magnetic circuits formed around the stator units 5a and 5b of the stator 5 will be explained in the following description.

Figure 4:
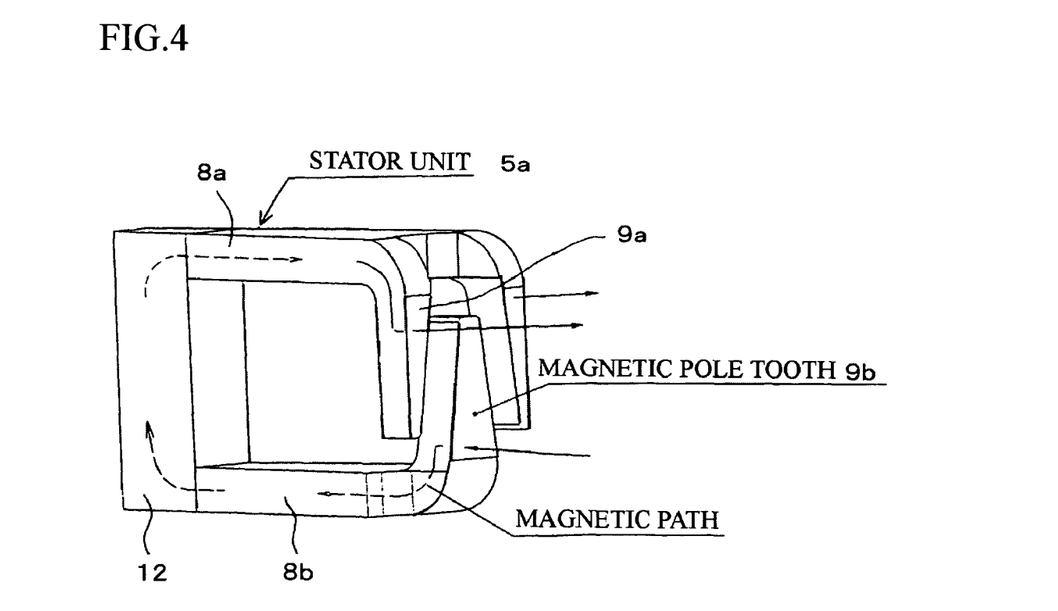
FIG. 4 is an explanation view of a first magnetic circuit.

A first magnetic circuit is shown in FIG. 4. In the stator unit 5a, for example, magnetic flux enters the lower claw pole 9b from the permanent magnet 2 (not shown) and returns to the permanent magnet 2 via the stator yoke 8b, the cylinder 12 and the stator yoke 8a, so that the magnetic circuit is formed. When the rotor 1 is rotated, magnetic density of the magnetic flux passing through the claw poles 9a and 9b varies, so that the cogging torque is generated.

Figure 5:
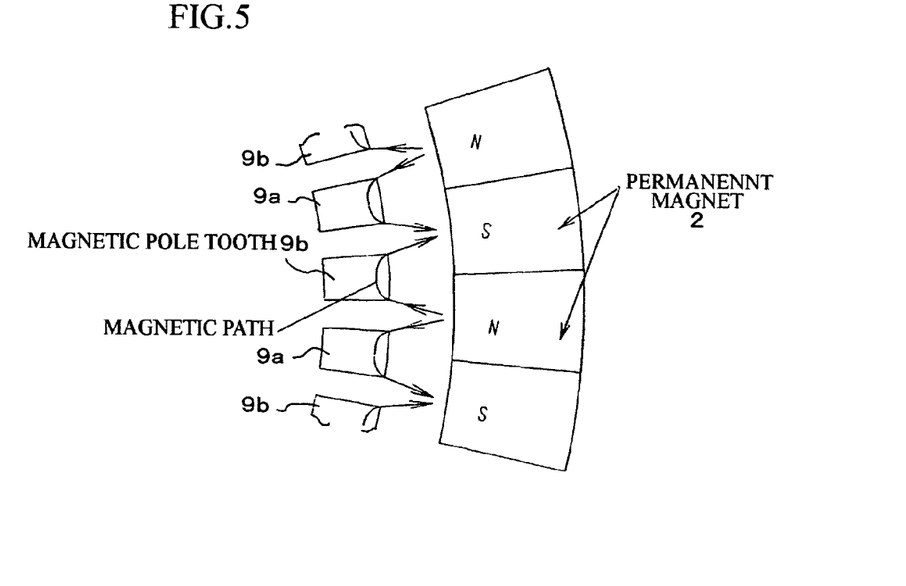
FIG. 5 is an explanation view of a second magnetic circuit.

A second magnetic circuit is shown in FIG. 5. FIG. 5 shows a cross-section perpendicular to an axial line of the rotor shaft 4. When the rotor 1 is rotated until boundaries N-poles and S-poles of the permanent magnet 2 align with centers of the claw poles 9a and 9b, the magnetic flux comes out from each of the N-poles of the permanent magnet 2 and enters the adjacent S-pole via the claw poles 9a and 9b, so that the magnetic circuit is formed. When the rotor 1 is rotated, flux density of the magnetic flux passing through the claw poles 9a and 9b varies, depending on the rotational position of the permanent magnet 2. Therefore, the cogging torque is generated.

Figure 6:
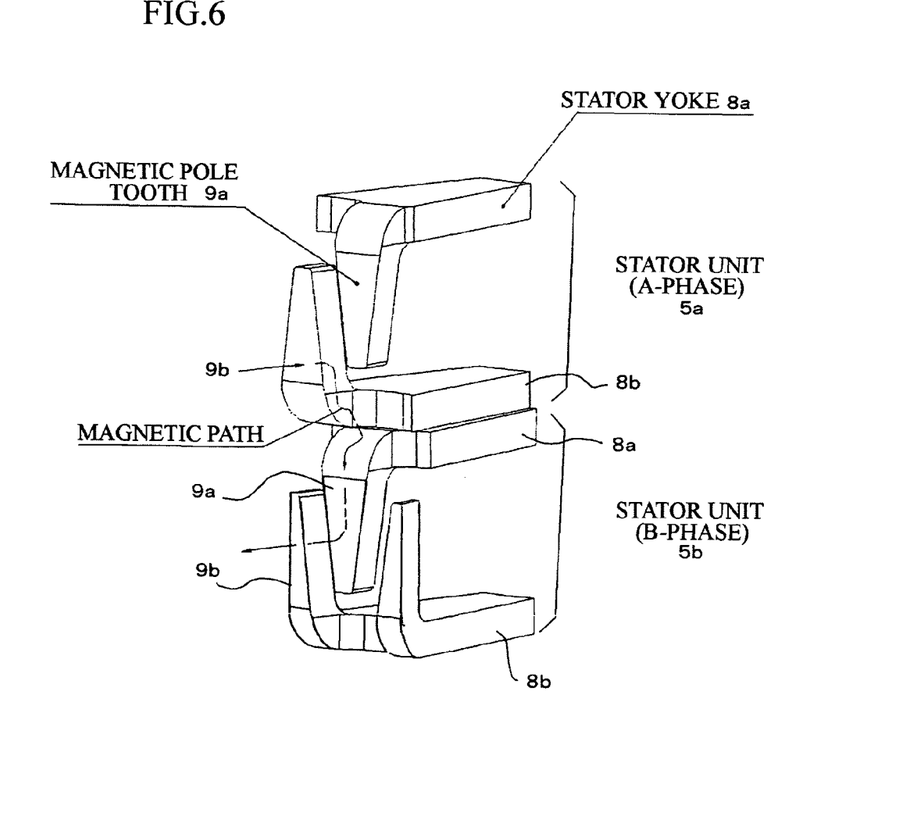
FIG. 6 is an explanation view of a third magnetic circuit.

A third magnetic circuit is shown in FIG. 6. In FIG. 6, the stator units 5a and 5b are stacked. For example, magnetic flux comes out from the permanent magnet 2 (not shown) and returns to the permanent magnet 2 via the claw pole 9b of the stator unit 5a and the claw pole 9a of the stator unit 5b, so that the magnetic circuit is formed in the boundary face between the stator units 5a and 5b. When the rotor 1 is rotated, flux density of the magnetic flux passing through the claw poles 9a and 9b varies, so that the cogging torque is generated. Cogging torque is generated in the boundary face between the stator units 5b and 5c and in the boundary face between the stator units 5c and 5d, as well. The cogging torque generated in the boundary faces of the stacked stator units are combined, so it cannot be ignored for designing characteristics of the motor.

Figure 16:
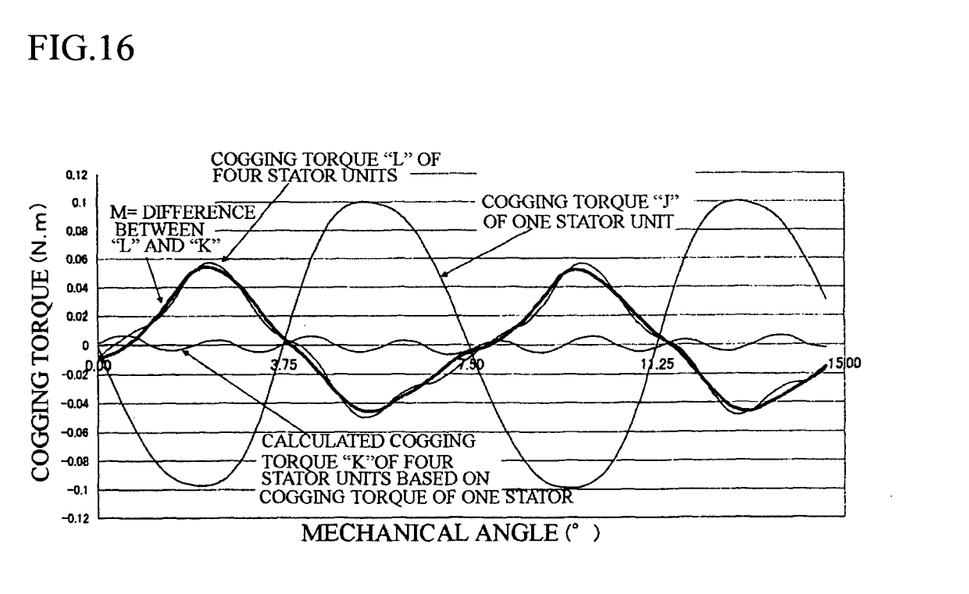
FIG. 16 is a graph showing influence of the cogging torque generated in the third magnetic circuit.

FIG. 16 shows magnetically analyzed amplitude of the cogging torque generated in the first to third magnetic circuits. In FIG. 16, the cogging torque of one stator unit, i.e., the cogging torque generated in the first and second magnetic circuits, is indicated as J; calculated cogging torque, which is the sum of the cogging torque J of four stator units further stacked, is indicated as K; magnetically analyzed cogging torque of four stator units is indicated as L; and the difference between the cogging torque L and K, i.e., the cogging torque in the third magnetic circuit, is indicated as M. According to the graph of FIG. 16, the cogging torque in the third magnetic circuit is theoretically greater than that in the first and second magnetic circuits. In the present invention, the stator units are stacked with prescribed phase differences between magnetic centers of the upper and lower magnetic pole teeth of the adjacent stator yokes so as to reduce the cogging torque generated in the third magnetic circuit. In the following description, a central position between the adjacent magnetic poles (claw poles) of the stator yokes vertically stacked will be explained as the magnetic center of the third magnetic circuit formed between the stator unit and the rotor.

Figure 7:
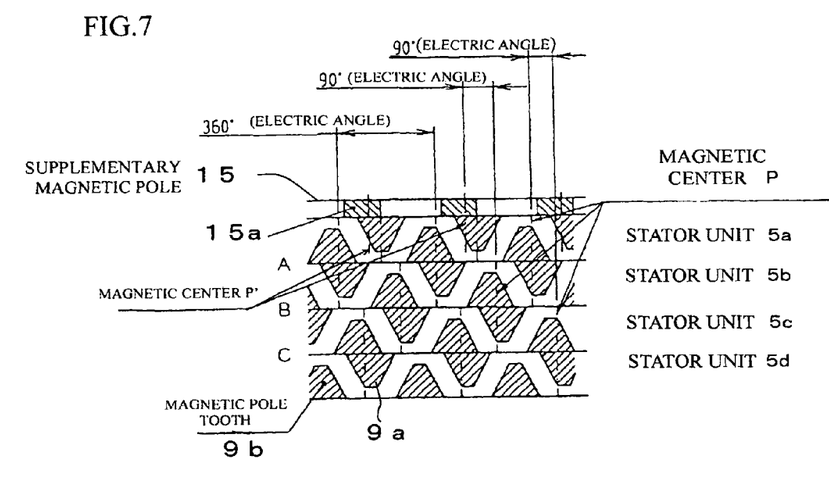
FIG. 7 is an explanation view of phase differences between magnetic pole teeth of the stator units.
Figure 8:
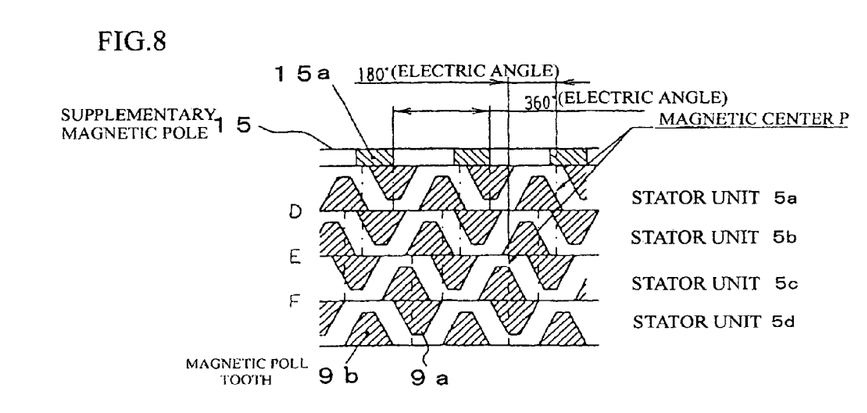
FIG. 8 is an explanation view of phase differences between magnetic pole teeth of the stator units.

FIGS. 7 and 8 are plan extended views of the claw poles 9a and 9b of the stator units 5a-5d, which are coaxially stacked. In FIG. 7, symbols A, B and C stand for boundary faces between the adjacent stator yokes of the stator units 5a-5d. The stator units are stacked, and the magnetic centers P of the third magnetic circuits formed in the boundary faces A and C are shifted at an electric angle of 90°.

Figure 11:
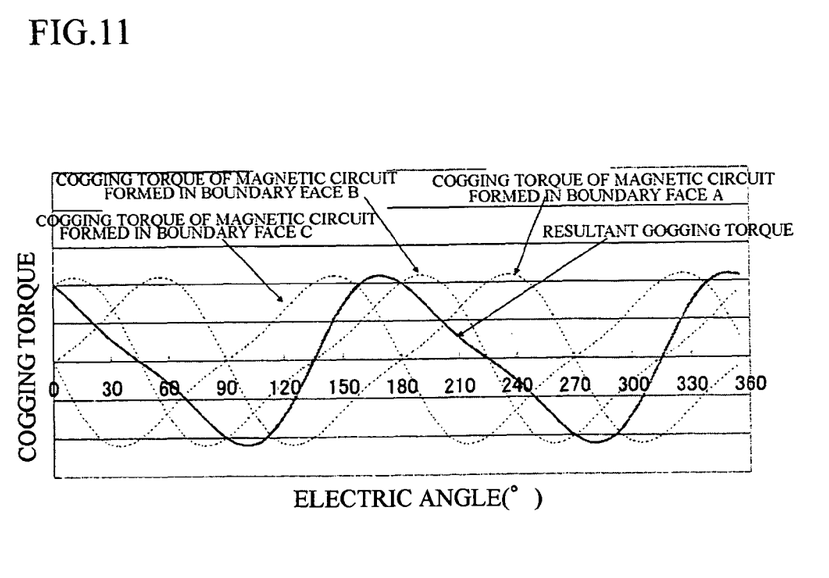
FIG. 11 is a waveform chart of cogging torque generated in the first to third magnetic circuits formed in the stator units shown in FIG. 7.

FIG. 11 is a waveform chart showing waveforms of the cogging torque generated in the third magnetic circuits of the boundary faces A, B and C (shown by dotted lines) and the resultant cogging torque thereof (shown by a solid line). According to the waveform chart of FIG. 11, the waveforms of the cogging torque in the boundary faces A and C, which are ideal sine waves including higher harmonic elements, are mutually reduced, so that only the waveform of the cogging torque generated in the third magnetic torque of the boundary face B is left. Therefore, the cogging torque caused by the variation of magnetic flux in the third magnetic circuit, which runs through the stator yokes 8a and 8b, the claw poles 9a and 9b and the permanent magnet 2, can be effectively reduced.

In FIG. 8, symbols D, E and F stand for boundary faces between the adjacent stator yokes of the stator units 5a-5d. The stator units are stacked, and the magnetic centers P of the third magnetic circuits formed in the boundary faces D and F are shifted at an electric angle of 180°.

Figure 12:
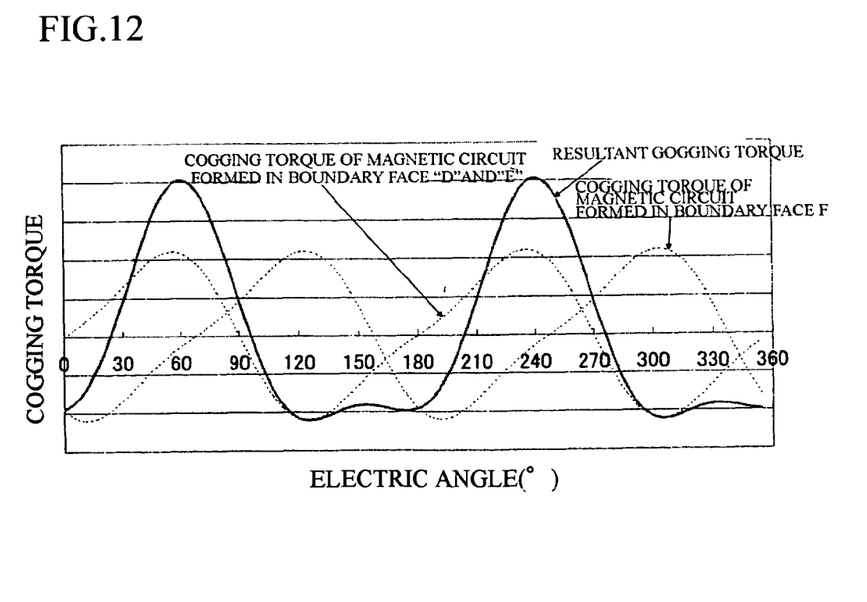
FIG. 12 is a waveform chart of cogging torque generated in the first to third magnetic circuits formed in the stator units shown in FIG. 8.
Figure 13:
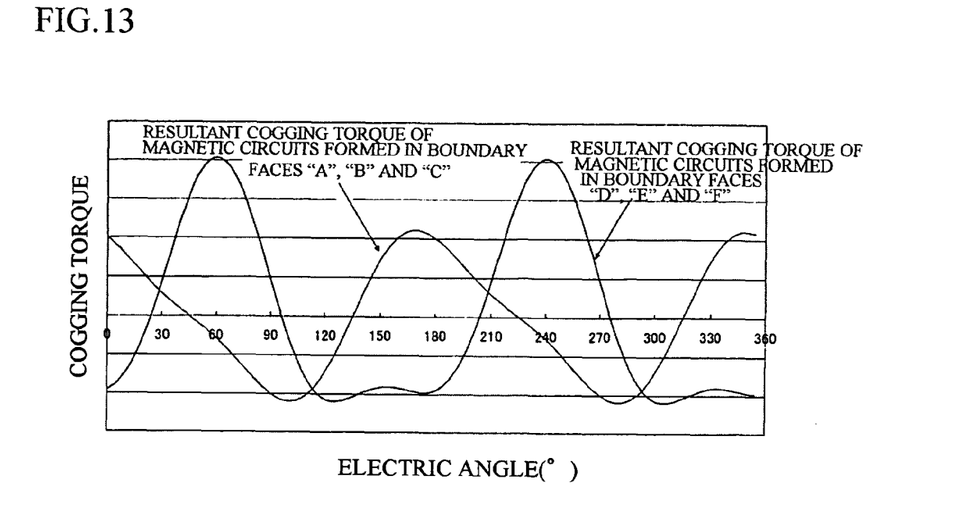
FIG. 13 is a waveform chart of the resultant cogging torque of FIGS. 11 and 12.

FIG. 12 is a waveform chart showing waveforms of the cogging torque generated in the third magnetic circuits of the boundary faces D, E and F (shown by dotted lines) and the resultant cogging torque thereof (shown by a solid line). Note that, the waveform of the cogging torque generated in the boundary face D coincides with that generated in the boundary face F. According to the waveform chart of FIG. 12, the waveforms of the cogging torque in the boundary faces D and F, which are ideal sine waves including higher harmonic components, overlap, so that amplitude of the waveform of the resultant cogging torque is increased.

Figure 15:
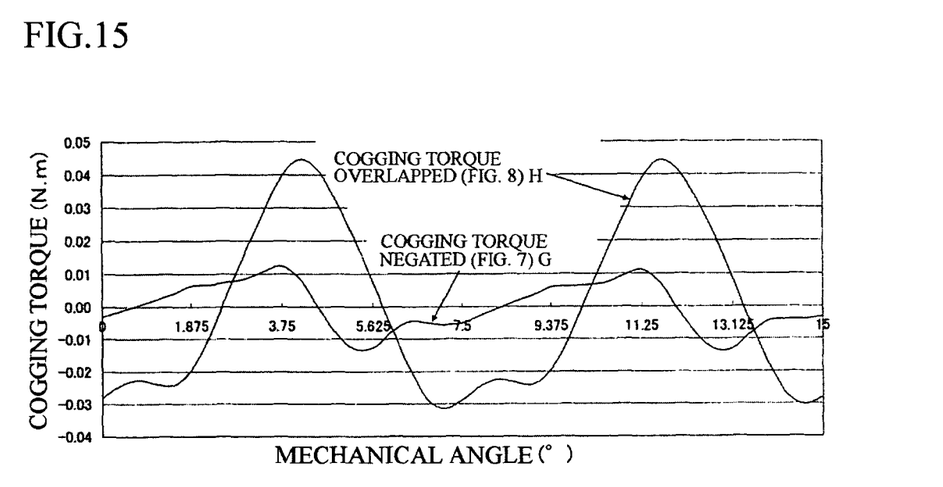
FIG. 15 is a graph of magnetically analyzed amplitude of the cogging torque generated in the stator units shown in FIGS. 7 and 8.

FIG. 15 is a graph of the resultant cogging torque G and H of FIGS. 7 and 8, which are magnetically analyzed. In comparison with the maximum values of the resultant cogging torque G and H, the cogging torque G of FIG. 7 is reduced to about a quarter of the cogging torque H of FIG. 8.

Figure 19:
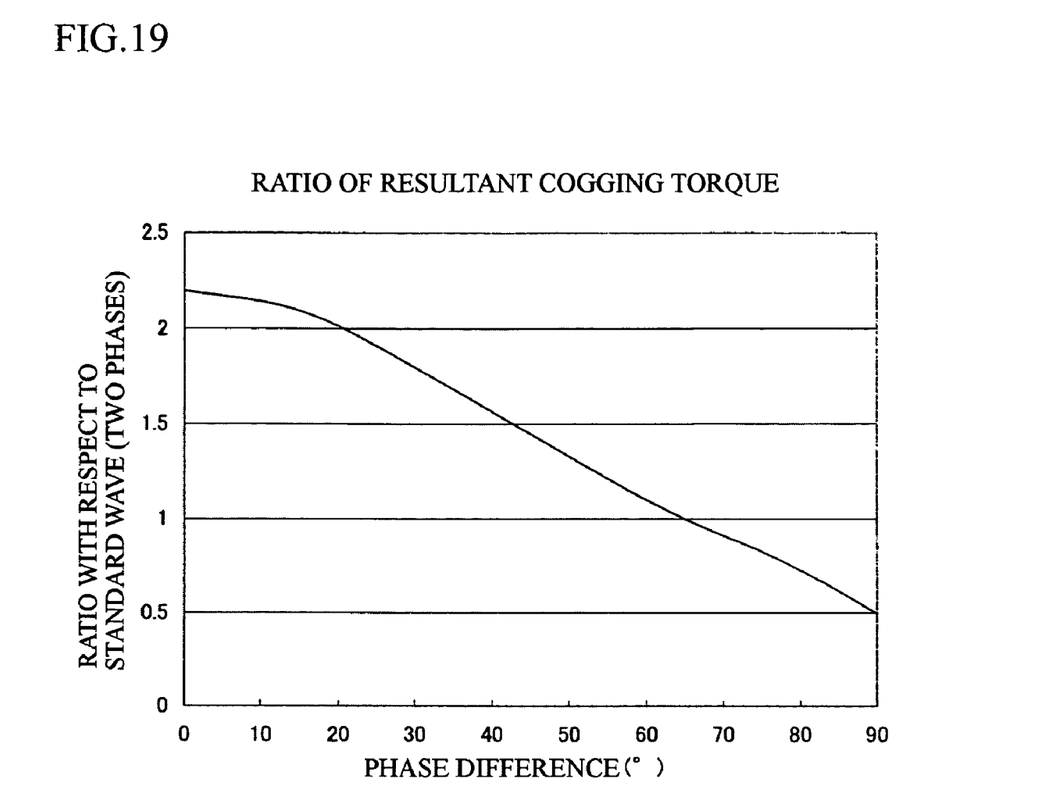
FIG. 19 is a graph showing a relationship between a phase difference between waveforms of cogging torque generated in two boundary faces and ratio of amplitude of resultant cogging torque with respect to that of a standard wave.

Next, combining the cogging torque generated in the third magnetic circuits will be described. For example, the cogging torque, which includes a standard wave component whose amplitude is defined as 1, is generated in one of the boundary faces A-C shown in FIG. 7 or one of the boundary faces D-F shown in FIG. 8. Then, a waveform of the cogging torque is combined with a waveform of another cogging torque, and their phases are mutually shifted with an optional phase difference. Further, the resultant cogging torque of the two is calculated. FIG. 19 is a graph showing a relationship between the phase difference between the waveforms of the both cogging torque (X-axis) and ratio of amplitude of the resultant cogging torque with respect to that of the standard wave, whose amplitude is 1 (Y-axis). When the phase difference is more than 90°, the graph extends diagonally right up, like a line-symmetrical curve. In spite of combining two waveforms of the cogging torque, the ratio exceeds 2 because optional higher harmonic components are included.

As described above, the cogging torque is reduced with increasing the phase difference and minimized when the phase difference is 90°. Even if the phase difference is not 90°, the amplitude of the combined waveform of the two is equal to that of the cogging torque generated in one boundary face when the phase difference is 90°±30°.

When the phase difference of the magnetic centers P (see FIG. 7) constituting the third magnetic circuits is considered, the effective range for reducing the cogging torque is an electric angle of 90°±30°. When the phase difference is at an electric angle of 90°, the influence of the cogging torque can be minimized.

Successively, a stator structure for further reducing the cogging torque generated in the third magnetic circuits will be explained with reference to FIG. 9.

Figure 9:
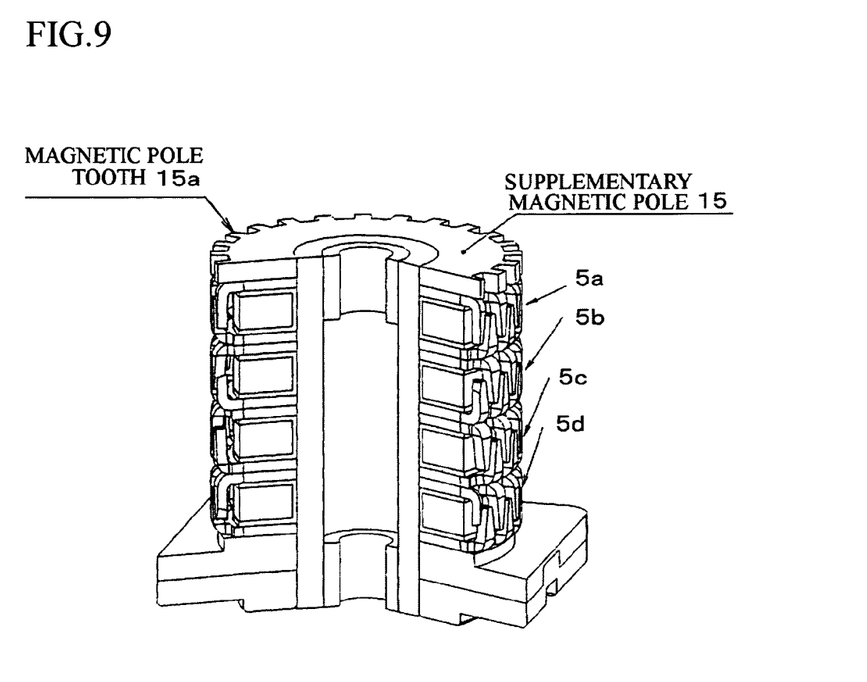
FIG. 9 is a partial cutaway view of a two-phase step motor of another embodiment.
Figure 14:
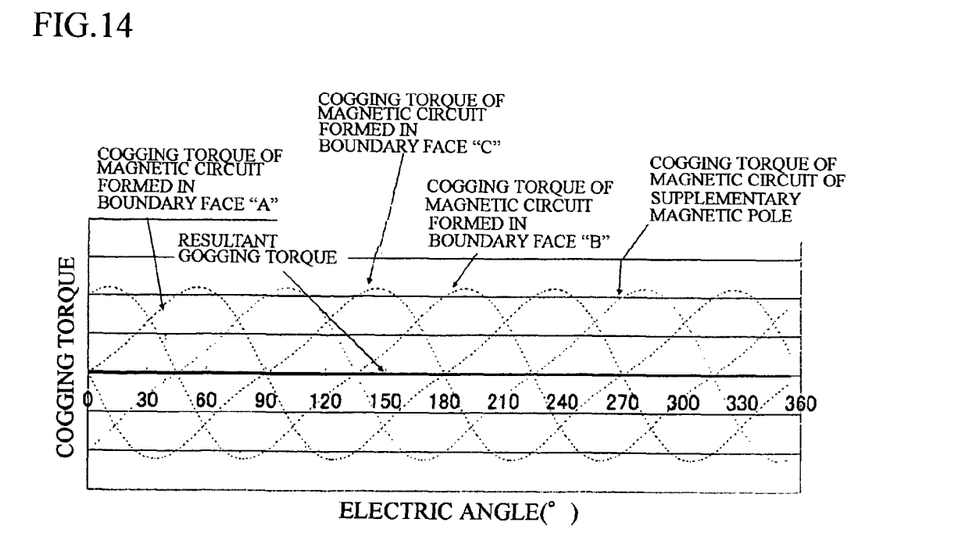
FIG. 14 is a waveform chart of cogging torque generated in the first to third magnetic circuits formed in the stator units shown in FIG. 9.

In FIG. 9, an even number of the stator units, e.g., four stator units 5a-5d, are stacked, and a supplementary magnetic pole 15, which is made of a magnetic material, is further stacked. Comb-shaped magnetic pole teeth 15a are continuously formed along an outer edge of the supplementary magnetic pole 15. The magnetic pole teeth 15a of the supplementary magnetic pole 15 are arranged with phase differences for highly reducing the cogging torque generated in the third magnetic circuit formed in only the boundary face B between the stator units 5b and 5c. By the supplementary magnetic pole 15, the waveforms of the cogging torque in the boundary faces A and C, which are ideal sine waves including higher harmonic elements, are mutually reduced. Further, the waveform of the cogging torque in the boundary face B and a waveform of cogging torque generated between the supplementary magnetic pole 15 and the permanent magnet 2 are highly reduced. Therefore, the resultant cogging torque is theoretically reduced (see FIG. 14). In case that an even number of the stator units are stacked with an odd number of the boundary faces, the supplementary magnetic pole 15 works effectively.

Figure 10:
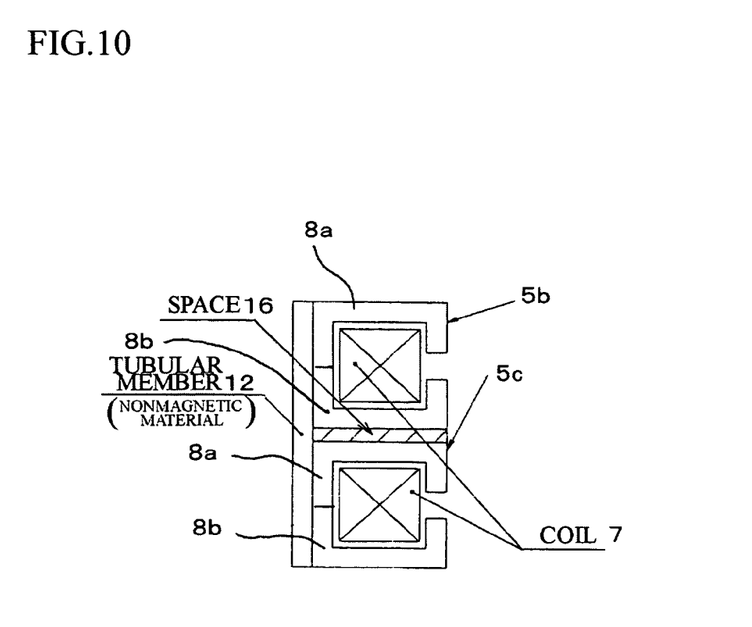
FIG. 10 is a partial sectional view of a two-phase step motor of further embodiment.

In FIG. 10, the cogging torque is generated in the boundary face between the stator units 5b and 5c, and the upper stator yoke 8b and the lower stator yoke 8a are magnetically insulated or magnetic resistance therebetween is increased by forming a space 16. In this case, the cylinder 12 is made of a nonmagnetic material so as not to form a new magnetic circuit. With this structure, it is difficult to pass magnetic flux through the boundary face of the adjacent stator yokes, so that flux variation is improbable. Therefore, generating the cogging torque in the third circuits can be highly prevented.

Figure 17:
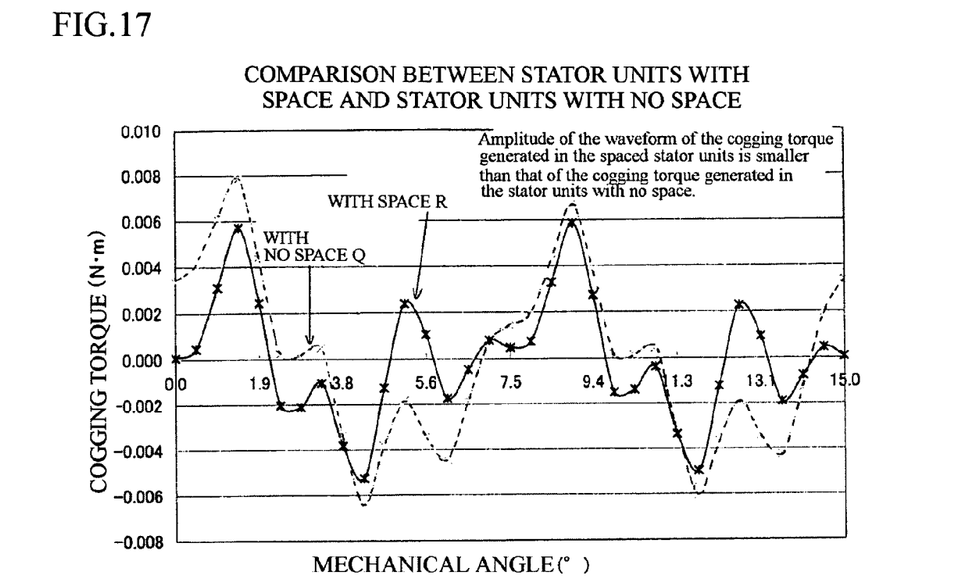
FIG. 17 is a waveform chart of cogging torque generated in boundary face between the stator units, in which a space and no space are respectively formed.

FIG. 17 is a waveform chart of cogging torque generated between the stator units 5b and 5c of the stacked stator units shown in FIG. 1, in which the space 16, e.g., 1 mm, and no space are respectively formed. According to FIG. 17, amplitude of a waveform Q of the cogging torque (shown by a dotted line), which is generated in the stator units with no space, is greater than that of a waveform R of the cogging torque (shown by a solid line), which is generated in the stator units with the space 16.

Figure 18:
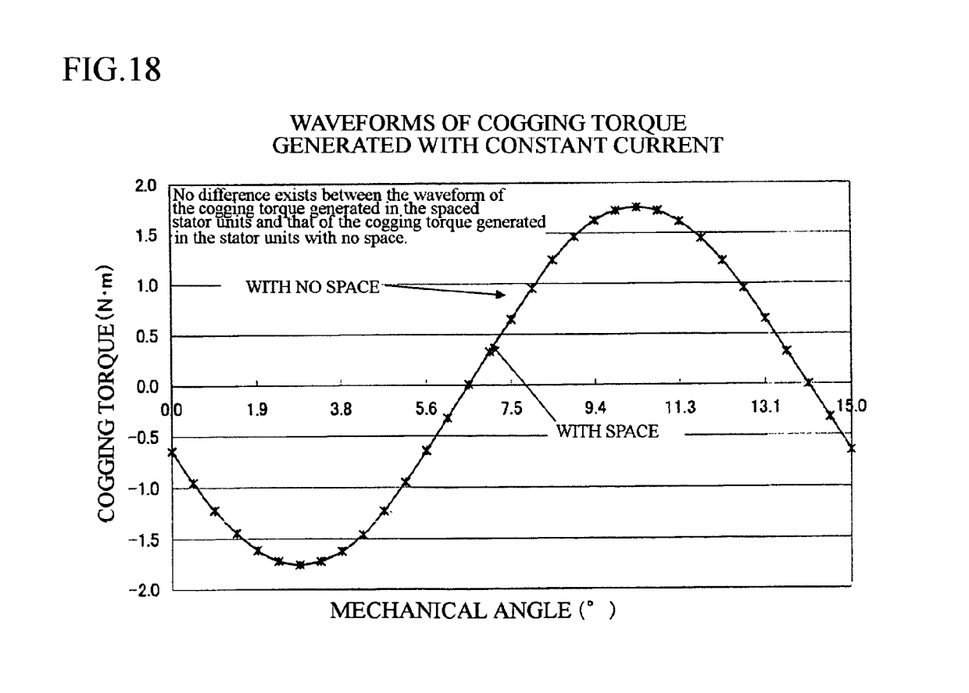
FIG. 18 is a waveform chart of cogging torque generated in the boundary face between the stator units, through which a constant current is passed and in which the space and no space are respectively formed.

FIG. 18 is a waveform chart of cogging torque generated in the boundary face between the stator units, through which a constant current is passed and in which the space and no space are respectively formed. According to FIG. 18, the waveforms of the two coincide with each other. Namely, the existence of the space causes no difference. In case that the cogging torque is generated in any boundary face by the third circuit without reference to number of stacking the stator units, the cogging torque generated in the boundary face can be reduced by forming the space 16 without reference to the structure of the stator 5.

In the above described embodiment, the two-phase step motor has been explained, but the present invention is not limited to the embodiment. For example, the present invention may be applied to multi-phase (three-phase, four-phase, n-phase) step motors, in each of which the axial length must be extended but vibration can be effectively reduced. Further, the stator units in one phase may be divided into three or more.

The above described step motor is the outer rotor type step motor, but the present invention may be applied to an inner rotor type step motor, too. Further, the present invention may be applied to not only a step motor, in which a current-running phase is switched by a drive circuit as open loop control, but also a brushless motor, which has a unit for detecting magnetic poles of a rotor and in which a current-running phase is switched by close loop control.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A permanent magnet type multi-phase rotary machine having an outer rotor, comprising:

a stator having four stator units coaxially stacked one on the other, each of which includes a pair of stator yokes having an even number of comb-shaped magnetic pole teeth formed at regular intervals, and a air-core coil which is sandwiched between the pair of stator yokes; and the outer rotor including a permanent magnet having a number magnetic poles which are fixed on an inner face of a cylindrical rotor yoke in a manner such that each of the magnetic poles is not divided in an axial direction, the magnetic poles respectively facing the magnetic pole teeth of the stator yokes, said rotor being rotatably supported by an output shaft, wherein each of the four stator units is assigned to either an A-phase or a B-phase, a second of the four stator units being stacked on the first stator unit, a third of the four stator units being stacked on the second stator unit, and a fourth of the four stator units being stacked on the third stator unit, the stator yokes of the four stator units respectively having the same number of magnetic pole teeth, which are formed in a rotational direction of said rotor at regular intervals, the four stator units being directly coaxially stacked, and the magnetic pole teeth being shifted with a prescribed phase difference with respect to the rotational direction of said rotor in all of the stator units, wherein three boundaries faces A, B, and C are formed between the stacked stator units, the first boundary face A being between the first and second stator units, the second boundary face B being between the second and third stator units, and the third boundary face C being between the third and fourth stator units, and wherein centers of mass of the adjacent magnetic pole teeth of the boundary face A, and the centers of mass of the adjacent magnetic pole teeth of the boundary face C are shifted with a phase difference of 90°±30°, thereby a resultant cogging torque of the cogging torques respectively generated in the magnetic circuits passing through the boundary faces A and C is reduced.

* * * * *